United States Patent
Malbasic et al.

(10) Patent No.: US 12,272,220 B1
(45) Date of Patent: Apr. 8, 2025

(54) REAL-TIME ENHANCED VIDEO SURVEILLANCE SYSTEM

(71) Applicant: Birdseye Security Inc., Mississauga (CA)

(72) Inventors: Ivan Malbasic, Belgrade (RS); Mike Grabovica, Toronto (CA); Luka Bajic, Belgrade (RS); Ahmed Zaidi, Toronto (CA); Ana Petrovic, Belgrade (RS); Slobodan Tanasic, Belgrade (RS)

(73) Assignee: Birdseye Security Inc., Mississauga (CA)

( * ) Notice: Subject to any disclaimer, the term of this patent is extended or adjusted under 35 U.S.C. 154(b) by 0 days.

(21) Appl. No.: 18/421,836

(22) Filed: Jan. 24, 2024

(51) Int. Cl.
G08B 13/196 (2006.01)
G06V 20/52 (2022.01)
G06V 40/50 (2022.01)

(52) U.S. Cl.
CPC ....... *G08B 13/19691* (2013.01); *G06V 20/52* (2022.01); *G06V 40/50* (2022.01); *G08B 13/19656* (2013.01)

(58) Field of Classification Search
CPC ........ G08B 13/19691; G08B 13/19656; G06V 20/52; G06V 40/50
USPC .................................. 348/153; 386/228, 226
See application file for complete search history.

(56) References Cited

U.S. PATENT DOCUMENTS

| | | | | |
|---|---|---|---|---|
| 5,448,290 A * | 9/1995 | VanZeeland | ........... | H04N 7/181 348/E7.086 |
| 7,508,941 B1 * | 3/2009 | O'Toole, Jr. | .......... | H04L 9/3263 380/232 |
| 7,659,922 B2 * | 2/2010 | Black | ............... | G08B 13/19656 348/148 |
| 8,606,073 B2 * | 12/2013 | Woodman | ........ | H04N 21/26258 386/230 |
| 8,823,797 B2 * | 9/2014 | Chen | ...................... | H04N 7/181 348/148 |
| 8,934,754 B2 * | 1/2015 | Billau | .................. | H04N 9/8205 386/226 |
| 9,330,339 B2 | 5/2016 | Hofman | | |
| 9,505,494 B1 | 11/2016 | Marlow et al. | | |
| 11,562,583 B1 | 1/2023 | Zaidi et al. | | |
| 2010/0123579 A1 * | 5/2010 | Midkiff | .................. | H04N 7/188 340/541 |
| 2020/0223757 A1 | 7/2020 | Oettinger et al. | | |
| 2024/0265731 A1 * | 8/2024 | Afshar | ................... | G06V 10/95 |

FOREIGN PATENT DOCUMENTS

| | | |
|---|---|---|
| GB | 2552092 | 1/2018 |
| JP | 2022514859 | 2/2022 |
| KR | 20190126607 | 11/2019 |

* cited by examiner

*Primary Examiner* — Helen Shibru

(74) *Attorney, Agent, or Firm* — Fish IP Law, LLP; Tomas A. Prieto

(57) ABSTRACT

A system for real-time security and facility supervision includes a plurality of cameras that continuously generate and stream audiovisual data. A computing device receives the streams and generates virtual rooms that include one or more of the streams. The computing device also monitors the streams and uses image recognition techniques to determine whether an event is occurring at the location being monitored. Upon detecting an event, the computing device matches a corresponding agent computing device to the virtual room where the event was detected.

11 Claims, 5 Drawing Sheets

REAL-TIME ENHANCED VIDEO SURVEILLANCE SYSTEM

FIELD OF THE INVENTION

The field of the invention is on-site surveillance systems.

BACKGROUND

The background description includes information that may be useful in understanding the present invention. It is not an admission that any of the information provided herein is prior art or relevant to the presently claimed invention, or that any publication specifically or implicitly referenced is prior art.

On-site security is a primary and ongoing concern for any organization. The development of cameras and motion sensors have helped automate what was traditionally a purely-human endeavor.

Traditional security systems require many agents-often one agent for every camera or every couple of cameras. This required large amounts of staffing, especially for large locations. It also required a constant monitoring of one or more live cameras by a human agent that can get tired, bored or otherwise distracted.

Attempts to reduce the number of required agents have suffered from their own limitations. For agents monitoring multiple feeds, there is only so much information that an individual person can process. Accordingly, a person monitoring many simultaneous feeds is likely to react late to or entirely miss an event.

Current automated systems are also lacking. There is an unacceptable lag between the moment an alert situation is recognized, the locating of an agent to attend to the alert and then initiate the feed for the agent. This delay can cause the agent to miss the alert situation entirely and thus prevent the agent from initiating a proper response.

Prior systems have attempted to use artificial intelligence ("AI") as a way to replace a human operator. In security systems, this has meant that AI has been developed with the intention of replacing a human agent. Unfortunately, this has not worked as well as expected. AI is still not at a level where it can determine a context to a satisfactory level. Additionally, these deficiencies are compounded in the security sector because in security applications, these deficiencies invoke a lack of trust in the actual security offered by the AI system.

Thus, there is still a need for a security system that is capable of quickly recognizing a situation needing the attention of an agent at a site and quickly and effectively identifying and routing applicable camera feed(s) to the agent.

SUMMARY OF THE INVENTION

To remedy the deficiencies in prior systems, the systems and methods of the inventive subject matter is an approach that uses AI systems programmed to assist human agents. The systems and methods of the inventive subject matter include computer system programmed for monitoring camera feeds/streams and alert the human element for the proper context and reaction in a given situation.

The inventive subject matter provides apparatus, systems and methods in which a surveillance system can detect an event happening based on one or more video streams streamed into a virtual room, identify an appropriate agent to handle the event, and then bring the agent's computing device into the virtual room so that the agent can receive the video stream(s) regarding the event.

The inventive subject matter includes a plurality of cameras disposed about a location. The cameras each capture at least one of video data and audio data (individually, or collectively as audiovisual data) of their views of the location. The cameras each then generate a stream of the video/audio data, which they provide to a receiving computing device (which can also be referred to as a central computing device). The receiving computing device generates a virtual room for each of the streams and assign each room a corresponding identifier.

In embodiments of the inventive subject matter, the central computing device can be a server system (made up of one or more computing devices). In embodiments of the inventive subject matter, the receiving computing device can be a multiplexer capable of handling multiple stream inputs and directing a stream output.

The central computing device analyses each of the incoming streams to determine whether a particular condition or event exists within one or more of the video streams.

Each agent computing device has an identifier of its own, which can correspond to the individual agent using the computing device.

Once the central computing device detects a condition existing in one or more of the incoming streams, it determines the appropriate agent to handle the detected condition. Once the appropriate agent has been located, the central computing device matches the agent computing device of the appropriate agent with the stream(s) that depict the detected condition based on the identifier of the room having the stream with the condition and the identifier of the agent computing device. The central computing device then provides the agent computing device access to the virtual room that already has the relevant stream(s) ongoing. This provides a real-time or near-real-time access to the event/condition as it is occurring.

The streams are provided in such a way that an agent can manipulate the streams to best be able to view what they wish to view to determine a course of action.

The central computing device can determine the existence of a condition that could amount to or contribute to the existence of an event by employing image recognition techniques to the streams and thus be able to recognize elements within the scenes. The elements that are recognized could be objects of interest, text, decals, logos, people, clothing, actions, movements, among other elements. Based on a recognized element or plurality of elements, the central computing device can determine that a condition exists.

An event that is cause for an alert can be made up of a single condition or multiple conditions, and the conditions can be detected from a single stream or across multiple streams within a virtual room.

In embodiments of the inventive subject matter, the virtual room presented to the agent via the agent's computing device can include a highlighting of the stream(s) where the event was detected and is occurring.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
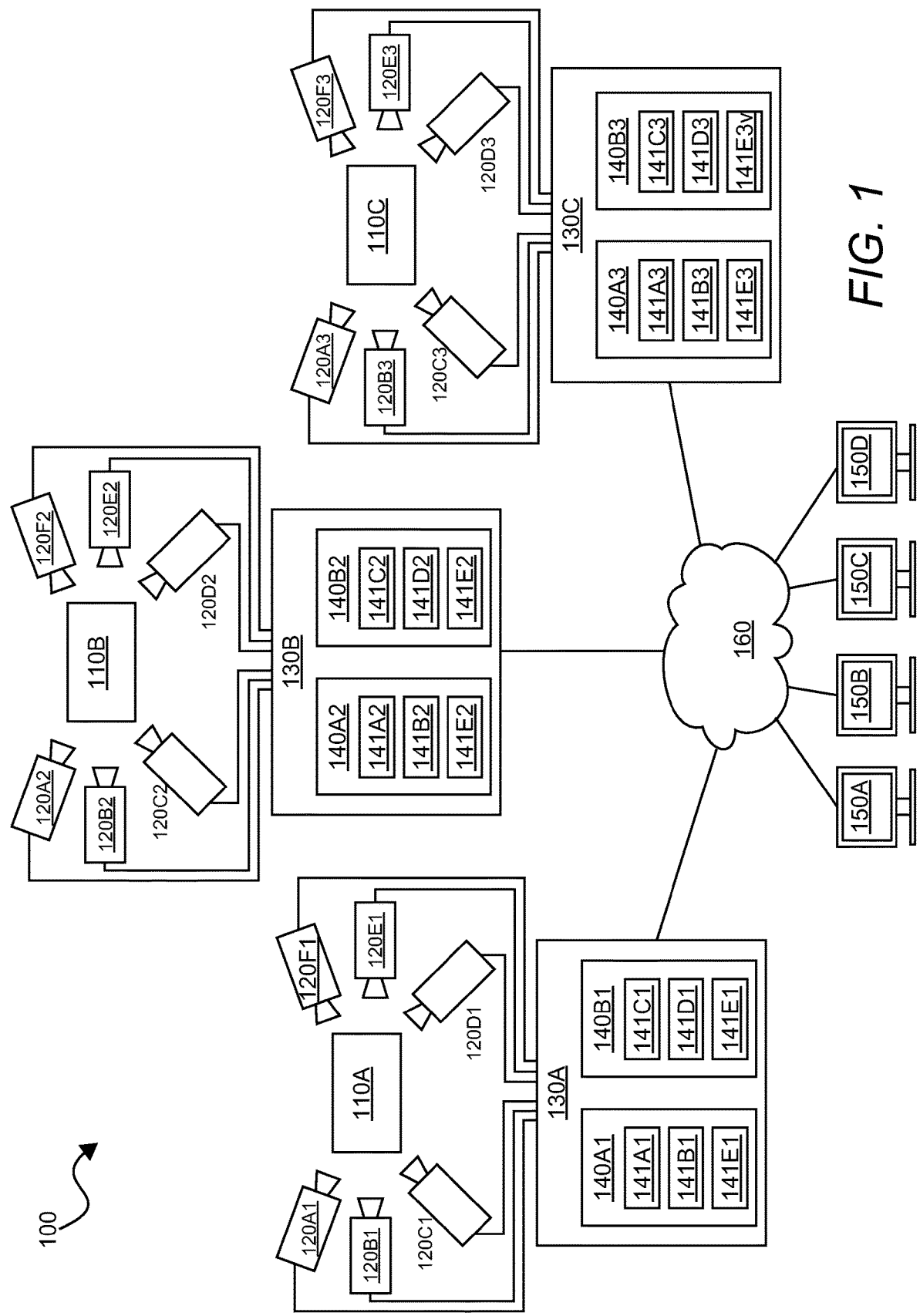
FIG. 1 is a diagrammatic overview of a system according to embodiments of the inventive subject matter.

FIG. 1 provides a diagrammatic overview of a system 100 according to embodiments of the inventive subject matter.

As seen in FIG. 1, the system 100 includes a plurality of locations 110A-C (collectively, location 110). Each location 110 includes cameras 120A-120F (collectively, cameras 120) numbered according to their respective location 110A-110C distributed within each location 110. The location 110 can be locations such as a facility, a warehouse, a factory, a truck-receiving facility, etc., with the cameras 120 distributed within and/or around the location 110 for the purposes of security monitoring and facilitating an alert response.

The cameras 120 are communicatively coupled with a computing device 130A-C (collectively, computing device 130) associated with their particular location 110. The cameras 120 can be connected via a local connection (e.g., wired or local wireless network) and/or remote connection (e.g., over the Internet) to the computing device 130, depending on the location of the computing device 130. The computing device 130 can be on site at the location 110 or located remotely from the location 110.

Embodiments where the computing device 130 is local to the location 110 (and thus, the cameras 120) enable for faster connection speeds between the cameras 120 and the computing device 130. In these embodiments, the connection between the cameras 120 and the computing device 130 can be a wired high-speed connection that is capable of speeds greater than is commonly available over wireless or other long-range communications connections. This way, the system ensures the bottleneck in bandwidth and speeds is not between the cameras 120 and the computing device 130.

FIG. 1 further shows the computing devices 130A-C associated with each respective location 110A-110C communicatively coupled with a plurality of agent computing devices 150A-150D (collectively "agent computing devices 150") over data exchange network 160 such as the Internet. The diagram of FIG. 1 shows three different locations 110A-110C as a way to illustrate that a small group of agent computing devices 150 could receive streams from a large number of cameras 120. As can be appreciated by the reader, the number of locations 110 and associated cameras 120 and computing devices 130 can be greater than shown, which only increases the amount of locations and camera feeds that a particular agent could be responsible for.

Each of the cameras 120 is capable of capturing image data, preferably in the form of video data. The cameras 120 can also include audio sensors capable of capturing audio data. The cameras 120 in the examples discussed herein are considered to be capable of capturing both video and audio in the form of audiovisual data. The cameras 120 generate a stream of the captured audiovisual data and transmit it to the computing device 130.

The computing device 130 includes at least one processor, at least one memory (e.g., RAM, ROM, hard-drive, etc.) that can store instructions executed by the at least one processor as well as data such as video data and other data associated with the functions discussed here. The computing device 130 also include a plurality of communication interfaces to exchange data with the cameras 120 and the agent computing devices 150.

In embodiments of the inventive subject matter, the computing device 130 can be a multiplexer. Other examples of suitable computing devices 130 can include one or more server computers, one or more workstation computers, desktop computers, laptop computers, etc.

The agent computing devices 150 are used by agents that are tasked with monitoring the location 110. In preferred embodiments, there are a smaller amount of agent computing devices 150 than there are cameras 120.

The agent computing devices 150 can include at least one processor, a memory, at least one display and one or more interfaces that allow an agent to interact with the device (e.g., mouse, keyboard, touchscreen, etc.). The agent computing devices 150 also includes communications interfaces that allow the computing devices 150 to exchange data with other computing devices over data exchange networks 160.

In preferred embodiments, one or more of the agent computing devices 150 are located remotely from the computing device 130. This means that the data connection between the agent computing devices 150 and the computing device 130 is a long-range connection such as over the internet, cellular networks, etc.

Figure 2:
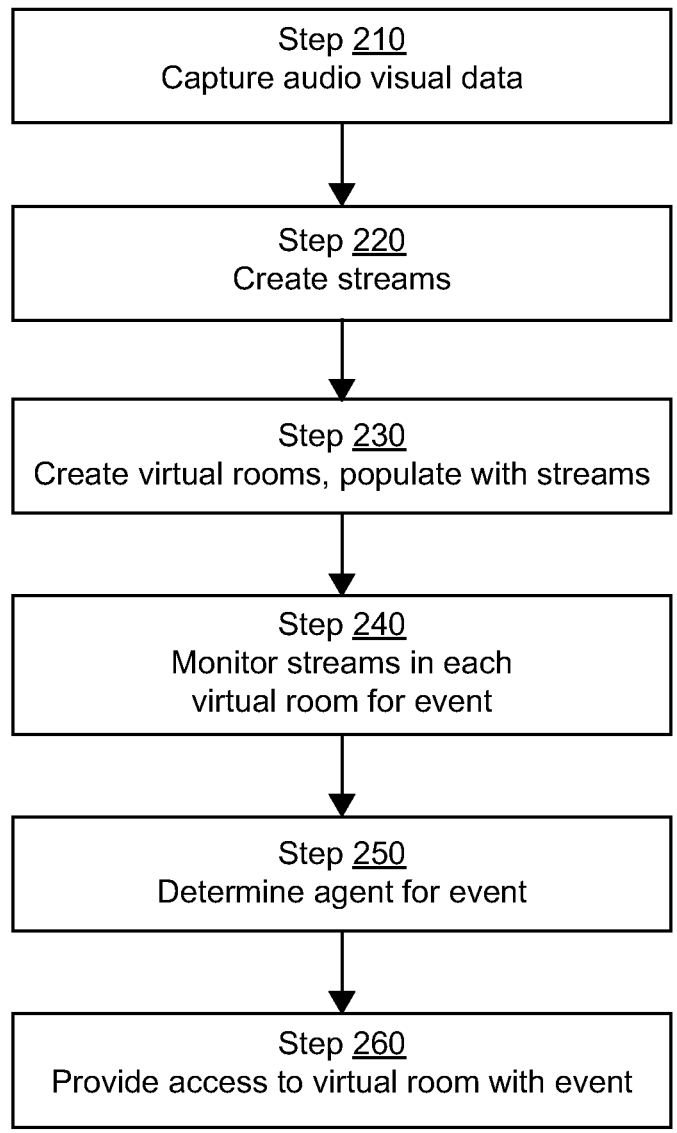
FIG. 2 is a flowchart of the processes executed by the various components of the system, according to embodiments of the inventive subject matter.

FIG. 2 is a flowchart of the processes executed by the various components of the system 100, according to embodiments of the inventive subject matter.

At step 210, the cameras 120 each capture image and/or audio data. As mentioned above, in preferred embodiments the cameras 120 capture audiovisual data that is made up of video data and corresponding sound data.

At step 220, the cameras 120 create a stream from the audiovisual data and stream the data to the computing device 130.

At step 230, the computing device 130 creates a plurality of virtual rooms 140A, 140B, 140C, etc. (collectively "virtual rooms 140") and directs at least one stream 141A, 141B, 141C, 141D (collectively "streams 141") into each of the virtual rooms 140. In embodiments of the inventive subject matter, a virtual room 140 can have more than one stream 141 in it. For example, in FIG. 1, virtual room 140A includes streams 141A, 141B while virtual room 140B includes streams 141C, 141D. For this example, stream 141A can be considered to come from camera 120A, stream 141B can be considered to come from camera 120B, stream 141C can be considered to come from camera 120C and stream 141D can be considered to come from camera 120D. Additionally, it is contemplated that a stream can be directed to more than one virtual room. Thus, for example, a stream 141E from camera 120E could be directed to both virtual rooms 140A and 140B.

The creation of the rooms at step 230 can happen prior to the initiation of the streams of step 220, such that the rooms are ready to have streams added to them as the cameras 120 come online and begin streaming. Additional rooms can be created as needed to accommodate new streams or new combinations of streams. Likewise, if a camera 120 comes on and begins streaming after other cameras 120 are already streaming, the computing device 130 can assign the "new" stream from the recently-initialized camera 120 to an existing room or create a new room for the new stream.

In embodiments of the inventive subject matter, each virtual room 140 can correspond to an area of coverage within the location 110, such as an entrance/exit, an area of normal foot traffic, an area with sensitive equipment, a receiving/shipping area, etc. The streams 141 within a particular virtual room 140 can also be grouped according to other criteria.

For example, streams 141 within a particular virtual room 140 can be grouped according to an alarm type. This way, when the alarm is triggered, the agent that receives entry into the room 140 knows that the views depicted in the streams 141 within the room have been selected specifically for that alarm type and thus are the best views available to ascertain context and action for that particular alarm type. For example, a facility could have six different gates. Each gate could have its own alarm and the layout of a virtual room 140 can include streams 141 that come from cameras 120 that particularly useful for each specific gate.

In another example, a particular gate could have different alarms associated with it depending on the type of entry through the gate. A truck could have a first alarm at the gate, and an individual entering on foot could have a different alarm. The views of the available cameras 120 at the gate could differ from one alarm to the next. For example, for a person, the streams 141 for the virtual room 140 for that particular alarm could be for views from cameras 120 having greater zoom capabilities to better be able to see the individual's face and other characteristics. For a truck, the alarm could have an associated virtual room 140 with streams 141 that have wider angles, higher angles and/or angles that are set to allow the system to read text or detect symbols on certain parts of the truck.

Having each virtual room 140 correspond to an alarm type can save time for the human agent that is provided the virtual room 140 access because they can be informed immediately what the alarm type is. For example, the presentation of the virtual room 140 can include text or other information that gives an agent information about the alarm type depicted in the virtual room 140.

At step 240, the computing device 130 monitors the streams 141 of virtual rooms 140 to detect a possible occurrence of a condition or of an event.

A condition can considered to be a single recognized occurrence or circumstance that a computing device 130 is able to recognize from the stream data.

An event can be considered to be a collection of one or more conditions that, when present together, has to be reported to an agent.

The events detected can be protocol-driven events in complex environments, and can involve complex protocols. A simple example of a protocol would be a person at a particular location at a particular time. These protocols can be considered parallel or collective in nature in that the combination of individual conditions at the same time.

However, it is contemplated that protocols can be sequential as well. For example, a person is observed to be at a particular location by a first camera 120 and is expected by the system to enter the view of a second camera 120 within a certain amount of pre-determined time (e.g., a range of time that a normal person would take to walk the distance between the two views). If the system does not the person within the view of the second camera 120 within the range of time, it determines an event has occurred requiring an alarm.

Sequential protocols can be multi-stage protocols where the overall protocol can have multiple alarms—for more than one stage. Thus, if an alarm is triggered at stage two of a seven stage protocol that causes an agent to be brought into the virtual room 140, the system can present to the agent via the agent computing device 150 which stage of the protocol the alarm corresponds to.

To detect a condition, the computing device 130 can use image recognition techniques known in the art. These image recognition techniques enable the computing device 130 to perform actions such as recognizing faces, gestures, direction of movement, speed of movement, urgency of movement, spatial relationships between objects in a scene, recognize alphanumeric text, etc.

Thus, the computing device 130 applies image recognition techniques to the streams 141 within a virtual room 140, and can detect the meeting of a condition based on the recognized elements within one or more of the streams 141.

Recognized conditions can include the computing device 130 detecting at least one of a person of interest or a person exhibiting a behavior of interest within one or more of the streams 141. For example a person of interest could be a person that is identified to be on a list of unauthorized persons, a person that is recognized but is not on a list of authorized persons or an unrecognized person. Examples of behaviors of interest can include a person loitering at a certain location for a certain amount of time, an irregular movement pattern, a detected intrusion (e.g., a person observed to be jumping a fence, cutting a fence, walking around a barrier, etc.), a person staring at a camera for a predetermined amount of time, etc.

Recognized conditions can also/alternatively include detecting an action or movement of non-human objects (e.g., a door opening, a gate opening, an object falling or flying past a camera view, etc.) or the recognition of an object within a stream (e.g., a weapon, a hazardous condition, a particular type of vehicle, etc.).

As will be discussed in further detail below, an event can be made up of one of the above types of conditions or several.

Figure 3:
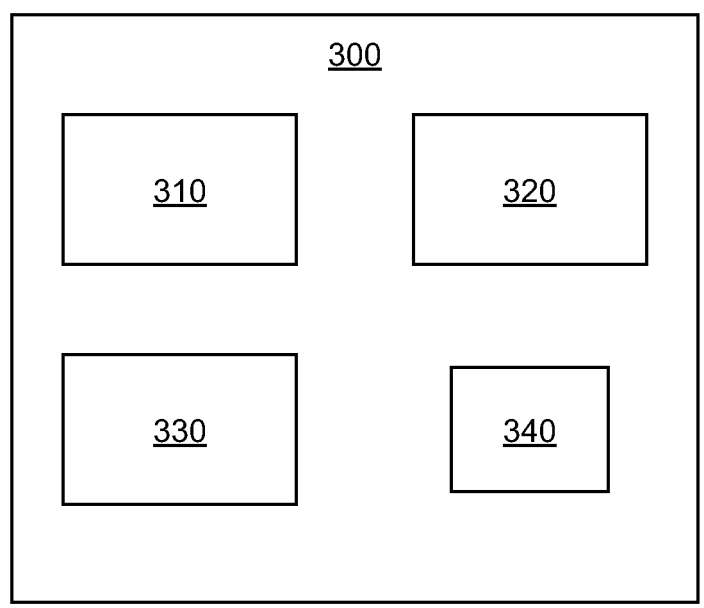
FIG. 3 is an illustrative diagram of the data components of an event.

FIG. 3 shows an illustrative example of an event 300. The event 300 includes a plurality of conditions 310, 320, 330 that all have to be met for the event 300 to be "realized", such that the computing device 130 then provides an alert or notification to one or more agents. The event 300 can also include information 340 such as an event type (e.g., security event, safety event, etc.) and agent identification information for one or more agents that are capable of handling this event. The agent identification information can include an identifier associated with the agent and/or an identifier associated with the agent's computing device 150. Other types of information 340 for the event can include a specific location or area within the location 110 that the event 300 is occurring, a time of the event (which can be obtained from a system time when the event is detected), and other information.

An event can include a single recognized condition or a combination of conditions (such as the one illustrated in FIG. 3).

In an example of a single-condition event, the presence of an unrecognized person within a particular camera's view alone is sufficient cause for event. If the camera views a restricted area within a location 110 where only authorized people are allowed, an unrecognized person would be cause for an event that needs to be reported.

In other instances, a single condition existing is not be sufficient to trigger an event but a combination of conditions triggers the event. For example, an area of location 110 such as a group of offices may periodically see people that are not on an authorized list, such as clients, vendors, delivery people, etc. For a situation such as this one, the mere presence of a person that the system 100 does not recognize would not be enough to trigger an event because it is expected that unknown people will be seen in this space. However, an event can be set to trigger if the computing device 130 identifies a person within one or more of the camera streams 141 that it does not recognize (i.e., not on an authorized person's list or the computing device 130 has been unable to recognize the person based on the stream(s)) and that remains within a particular area for a predetermined amount of time (e.g., the person is loitering). In other examples, the computing device 130 can determine that an event is occurring when there is an unrecognized person within a certain area that is seen using a camera, moving erratically, looking in a direction of restricted access, etc. As noted above, the events can in parallel/combination and/or sequential, or a combination of both types.

Because a virtual room 140 can contain multiple streams 141, the detected conditions that make up an event can be detected by the computing device 130 from different streams. For example, a first stream 141A corresponding to camera 120A could show a person that the computing device 130 does not recognize because the camera 120A could see their face, but the computing device 130 could not find their face in an authorized person's list. The person then moves such that they enter the field of view of camera 120B and thus the stream 141B, from which the computing device 130 can determine that they are holding their phone in a way that implies they are taking pictures or video. Based on the identification of the person as one not in an authorized list from the stream 141A and the action of appearing to take images or video in stream 141B, the computing device 130 can determine that an event is occurring.

In a variation of this example, the list could be a list of people that are prohibited from being at the location 110. In this example, the condition is met by matching the identified person to a name on the prohibited persons' list.

In another example, a condition giving rise to an event (or contributing to an event in combination with other conditions) can be the detection of an object of interest within one or more streams. An object of interest can be a vehicle, a vehicle of a particular type, a weapon, a product, etc.

In another example, a condition giving rise to an event can be based on a recognition of a decal, symbols or text on a surface, such as a truck. The decal, symbols and/or text can be detected by the computing device 130, which if they match a particular symbol or text for the event, cause the computing device 130 to determine that an event is occurring. This event could be the arrival of a truck at a facility that has a number and/or a tag with a number, a delivery, etc. The response for this can simply be for an agent to open a gate to allow ingress.

In a variation of this example, the condition giving rise to an event is a vehicle that carries numbers and/or symbols that are not recognized by the system 100. For example, if a truck arrives at a facility and the computing device 130 recognizes that text is present at a location on the truck that the computing device 130 recognizes as the proper place for an identification number, the computing device then checks the detected number against known identification numbers. If no matching numbers are found, the computing device 130 determines that an event is occurring—an unrecognized vehicle attempting to gain entry. In this situation, the alert can be to an agent that can then call the police.

The examples above contemplate events related to potential security situations. Events can also be associated with safety, and process and machine operations. For example, an event could be determined based on a piece of automated machinery that has been observed to be stationary for a pre-determined period of time. Another event could be determined based on an individual observed in a stream 141 to not be wearing a hardhat or other safety equipment at an area of location 110 that is deemed to require proper safety equipment. In still another example, an event can be a vehicle arrival or a delivery, such as in the truck example discussed above. Other types of events that require agent intervention are also contemplated.

At step 250, the computing device 130 determines an agent that is to handle the identified event based on the type of event and attributes associated with agent.

To do so, the computing device 130 or other separate computing device can include a database that stores information about each agent. It can include information about agents currently on duty, their names, the types of events they handle, and an identifier for their agent computing device 150.

Thus, after determining the event at step 240 (and thus, the type of event), the computing device 130 can match an agent to the event based on the event type. In embodiments that include an agent identifier or agent computing device identifier within the event information, the computing device 130 can match an agent identified within the event information with the event. Other factors can be used in matching the event with the agent, including a connection speed of the agent computing device 150, an authority or position level of the agent, etc.

At step 260, the computing device 130 provides access to the virtual room 140 having the streams that depict the occurring event to the agent computing device 150 corresponding to the handling agent identified at step 250. As the streams 141 are already ongoing within the virtual room 140, the agent computing device 150 obtains a lag-free connection to the streams 141 and the agent is therefore able to immediately view the ongoing event.

As a part of step 260, the computing device 130 can, in embodiments, provide a notice to the agent computing device 150 of the agent that is being provided access to the virtual room 140 containing the streams 141 depicting the event. This can include a prompt or button for the agent to press on the screen that causes them to enter the corresponding virtual room 140.

Because the virtual room 140 includes the streams 141 themselves instead of a mirrored video feed, the agent can have access to features via their computing device 150 that allows them to manipulate or otherwise control the stream 141. This can include zoom options, recording options, switching camera views, etc.

In embodiments of the inventive subject matter, the agent can, via the computing device 150, control the cameras 120 providing the streams 141 to change the angle, zoom in, etc., to get imagery of interest. The controls are passed through the computing device 130 to the agent computing device 150, whereby the camera commands are passed back through from the agent computing device 150 to the computing device 130 who then relays the commands back to the camera 130.

Figure 4:
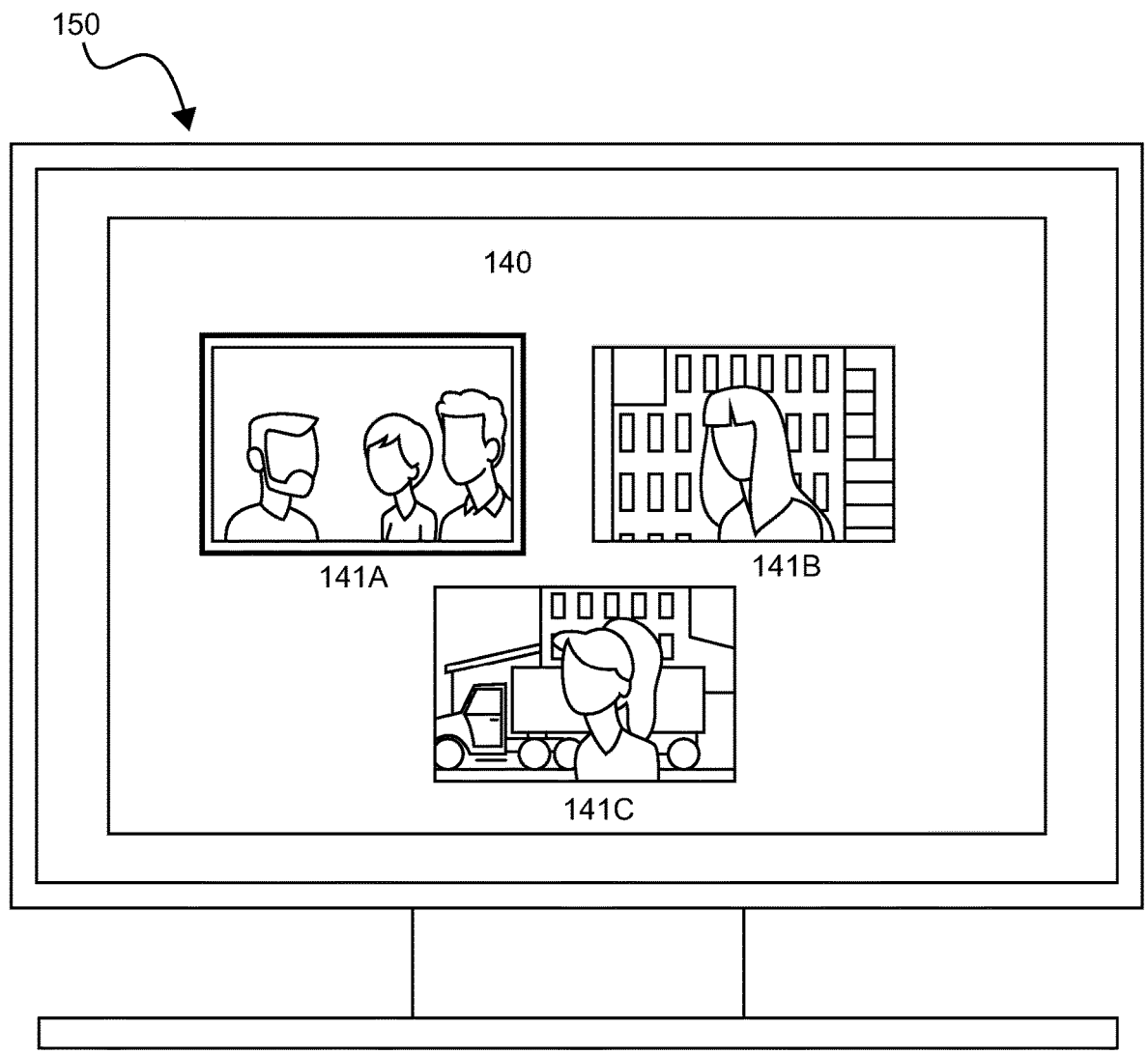
FIG. 4 shows an example of an embodiment where a stream among a plurality of streams within a virtual room is highlighted.

In embodiments of the inventive subject matter, the computing device 130 can highlight the streams 141 within a virtual room 140 that correspond to the cameras 120 that captured the imagery leading to the determination of the event. Thus, for example, a virtual room 140 that has multiple streams 141 will have a stream highlighted. FIG. 4 shows an example of this embodiment, where stream 141A (of virtual room 140 displayed on agent computing device 150) is highlighted as it was the stream in which the computing device 130 discovered the event. Here, the stream 141A is displayed in such a way that it stands out from streams 141B, 141C. However, other ways of highlighting the stream are contemplated. For example, a highlighted stream can be placed in front of other streams within a virtual room.

To illustrate how a virtual room 140 could provide views of a complex environment, stream 141A depicts a group of people. Stream 141B shows a person in front of a building, and stream 141C shows a person in front of a truck. In each stream 141 of FIG. 4, the system is capable of recognizing separate elements (each individual, the person and the building, the person and the truck) using techniques discussed herein and keep track of each element.

Figure 5:
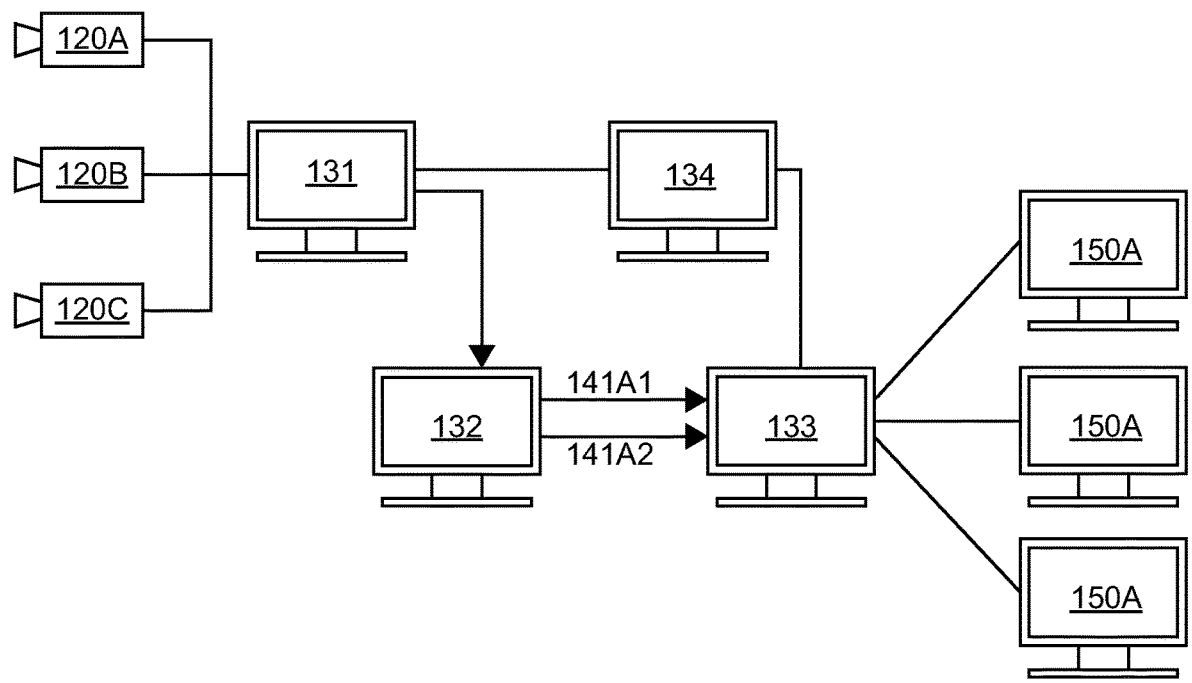
FIG. 5 provides an illustrative overview of an alternative embodiment of the inventive subject matter.

In embodiments of the inventive subject matter, the computing device 130 can be a combination of a proxy server 131, a media server 132, a multiplexer 133, and a recognition computing device 134. FIG. 5 provides an illustrative overview of these embodiments.

In these embodiments, the streams 141 from the cameras 120 are fed to the proxy server 131, which can perform processing functions on one or more of the streams 141. For example, the proxy server 131 can split a stream 141 into multiple streams (shown as 141A1 and 141A2 in FIG. 5). One of the streams can be fed to a computing device 134 for object detection and classification, as well as conditions and event detection as discussed above. The other stream from the split stream is fed to a media server 132 that then feeds the stream(s) 141 to the multiplexer 133. Based on a detected event, the computing device 134 passes the event to the multiplexer 133 which is programmed to then provide the streams 141 related to the event to the appropriate agent computing devices 150 as discussed above.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for real-time security and facility supervision, comprising:
    a plurality of cameras disposed at a location, each of the plurality of cameras programmed to:
        continuously capture at least one of image data and audio data; and
        generate a stream containing the at least one of the image data and the audio data;
    a plurality of agent computing devices, each of the agent computing devices having an agent identification number;
    a computing device programmed to:
        receive each stream corresponding to each of the cameras from the plurality of cameras;
        generate a plurality of virtual rooms, each virtual room comprising a selection of streams and wherein each stream is accessible in one or more virtual rooms;
        assign an identifier to each virtual room;
        monitor each of the plurality of streams for the occurrence of an event;
        upon determining the occurrence of the event on at least one of the plurality of streams:
            determining an appropriate agent based on a type of event;
            matching the agent identification number of the appropriate agent with the identifier of the virtual room having the stream associated with the identified event; and
            providing, in real time, the virtual room having the stream associated with the identified event to the agent computing device having the matching agent identification number.

2. The system of claim 1, wherein the computing device programmed to monitor each of the plurality of streams for the occurrence of the event comprises:
    apply at least one image recognition technique to each of the plurality of streams;
    determine, via the image recognition technique, that a condition associated with the event has been met on the at least one of the plurality of streams; and
    based on the determination that the condition associated that the event has been met, determine that the event has been detected on the at least one of the plurality of streams.

3. The system of claim 2, wherein applying at least one image recognition technique to each of the plurality of streams further comprises the computing device programmed to:
    recognize at least one of an object of interest within the stream or a decal containing at least one of text or a known symbol; and
    determine that the condition associated with the event has been met based on the recognized object of interest or decal.

4. The system of claim 2, wherein applying at least one image recognition technique to each of the plurality of streams further comprises the computing device programmed to:
    recognize at least one of (a) a person of interest within the stream or (b) a person observed exhibiting a behavior of interest within the stream; and
    determine that the condition associated with the event has been met based on the at least one of the person of interest or the person exhibiting the behavior of interest.

5. The system of claim 4, wherein the behavior of interest comprises at least one of loitering within a certain position for a predetermined amount of time, an irregular movement pattern, a detected intrusion, or looking at a camera for a predetermined amount of time.

6. The system of claim 4, wherein the person of interest comprises at least one of a person identified to be on a list of unauthorized persons, an identified person that is not on a list of authorized persons, or an unidentified person.

7. The system of claim 2, wherein determining that a condition associated with the event has been met further comprises the computing device programmed to:
    determine, via the image recognition technique, that an alarm condition is present; and
    determine the appropriate agent based on the determined alarm condition.

8. The system of claim 1, wherein the computing device comprises a multiplexer.

9. The system of claim 8, wherein providing the virtual room to the agent computing device comprises the multiplexer programmed to output the stream having the identified event to the agent computing device.

10. The system of claim 1, wherein the computing device is local to the plurality of cameras.

11. The system of claim 10, wherein the plurality of agent computing devices are located remotely from the computing device.

* * * * *